(12) United States Patent
Tsutsui

(10) Patent No.: US 7,086,495 B2
(45) Date of Patent: Aug. 8, 2006

(54) TRANSMISSION-RATIO-VARYING STEERING APPARATUS

(75) Inventor: Toshio Tsutsui, Takahama (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/990,418

(22) Filed: Nov. 18, 2004

(65) Prior Publication Data
US 2005/0133295 A1   Jun. 23, 2005

(30) Foreign Application Priority Data
Dec. 19, 2003   (JP)   ............................. 2003-422904

(51) Int. Cl.
B62D 5/04   (2006.01)
(52) U.S. Cl. .................... 180/443; 180/444; 180/446; 180/402; 701/41
(58) Field of Classification Search ................ 180/443, 180/444, 446; 701/41
See application file for complete search history.

(56) References Cited

U.S. PATENT DOCUMENTS 5,798,634 A * 8/1998 Terada et al. ............... 323/207
6,868,933 B1 * 3/2005 Kameya ...................... 180/404
6,915,194 B1 * 7/2005 Kodama et al. .............. 701/41
6,922,621 B1 * 7/2005 Kodama et al. .............. 701/41

FOREIGN PATENT DOCUMENTS

JP   A-2000-351383   12/2000

* cited by examiner

Primary Examiner—Lesley D. Morris
Assistant Examiner—Marlon Arce-Diaz
(74) Attorney, Agent, or Firm—Posz Law Group, PLC

(57) ABSTRACT

A transmission-ratio-varying steering apparatus has a control circuit capable of storing a rotation angle between input and output shafts in a non-volatile memory when the generator outputs a surge voltage. The transmission-ratio-varying steering apparatus includes clamp means provided between a battery and generator on one side and a power-supply circuit on the other side. The clamp means clamps a surge voltage generated by the generator to a third predetermined voltage higher than a first predetermined voltage but lower than a second predetermined voltage. If a surge voltage higher than the second predetermined voltage is generated by the generator, a self-protection function of the power-supply circuit can be prevented from cutting off power being supplied to a microcomputer and an EEPROM.

6 Claims, 8 Drawing Sheets

TRANSMISSION-RATIO-VARYING STEERING APPARATUS

CROSS REFERENCE TO RELATED APPLICATIONS

This application is based upon, claims the benefit of priority of, and incorporates by reference the contents of, Japanese Patent Application No. 2003-422904 filed on Dec. 19, 2003.

FIELD OF THE INVENTION

The present invention relates to a transmission-ratio-varying steering apparatus for changing a transmission ratio of a steering angle of the steering wheel of a vehicle.

BACKGROUND OF THE INVENTION

In a conventional relative-angle sensor, such as that disclosed in, for example, JP-A No. 2000-351383, the rotation angle between the input and output shafts when the steering wheel is held at a neutral position is assumed to be during an operation to detect a rotation angle between the input and output shafts. Thereafter, the relative angle changes when the steering wheel is operated. A control unit cumulatively adds or subtracts changes the relative angle periodically to find the rotation angle between the input and output shafts (an absolute angle). The relative angle changes because the steering wheel is operated. The control unit comprises a non-volatile memory for storing the rotation angle between the input and output shafts, a control microcomputer for writing the rotation angle between the input and output shafts into the non-volatile memory, and a capacitor for supplying power to the non-volatile memory and the control microcomputer. The control microcomputer stores the rotation angle into the non-volatile memory only when the transmission-ratio-varying steering apparatus is stopped. At that time, a battery supplies power to the non-volatile memory and the control microcomputer. As the transmission-ratio-varying steering apparatus is operated again, the control unit reads out the rotation angle, which was between the input and output shafts at the time the transmission-ratio-varying steering apparatus was stopped, from the non-volatile memory, and controls an operation to drive an electric motor.

The transmission-ratio-varying steering apparatus has a power-supply circuit for clamping a voltage (of about 12V) from a power supply and a generator for supplementing power supplied by the power supply to a voltage (in the range 3.3 to 5V) of an operating range of the control unit. Thus, a clamped voltage in the operating range is supplied to the control unit.

Generally, when a heavy load is inadvertently disconnected due to, for example, a terminal loosened from the battery in the course of a travel motion of the vehicle, a surge voltage (of about 30V or higher) is generated by the generator. In this case, when such a surge voltage is supplied to the conventional power-supply circuit in the conventional configuration, a self protection function operates to cut off power being supplied to the control unit. For this reason, when the self-diagnosis function of the power-supply circuit operates, no power is supplied to the control unit, so that the function of the control unit ceases to work. Therefore, with the transmission-ratio-varying steering apparatus stopped, the control unit is not capable of storing a rotation angle between the input and output shafts into the non-volatile memory. As a result, the transmission-ratio-varying steering apparatus has a problem that, as the transmission-ratio-varying steering apparatus is operated again, the present rotation angle between the input and output shafts cannot be fetched from the non-volatile memory. Consequently, the control circuit is not capable of controlling an operation to drive an electric motor.

A power-supply circuit including measures to clamp a surge voltage generated by the generator to a voltage in an operating range of the control unit can avoid a cut-off of the power being supplied to the control unit. However, a power-supply circuit is generally implemented as an integrated circuit (IC). Thus, components having sizes larger than the conventional ones must be used in the IC of the power-supply circuit. This leads to an increase in size of the power-supply IC.

SUMMARY OF THE INVENTION

Accordingly, it is an object of the present invention to provide a transmission-ratio-varying steering apparatus having a control circuit capable of storing a rotation angle between input and output shafts in a non-volatile memory even if a generator outputs a surge voltage. Preferably, the control circuit does not increase the size of a power-supply circuit.

According to a first aspect, the transmission-ratio-varying steering apparatus comprises: an input shaft connected to a steering wheel; an output shaft connected to steered wheels; an electric motor for varying a rotation angle of the output shaft with respect to a rotation angle of the input shaft; a relative-angle detection means for detecting a relative angle between the input and output shafts; a rotation-angle computation means for computing an absolute angle based on a relative angle detected by the relative-angle detection means; a non-volatile storage means for holding an absolute angle computed by the rotation-angle computation means; a control unit, which has a storage supplementary means for writing an absolute angle into the non-volatile storage means and is used for controlling an operation to drive the electric motor in order to change the rotation angle of the output shaft; and a power-providing means, which is used for clamping a voltage generated by a power supply and a generator for supplementing power supplied by the power supply to a voltage not exceeding a first predetermined voltage and supplying the clamped voltage to the control unit when the voltage generated by the power supply and the generator is normal, and is used for discontinuing an operation to supply power to the control unit when the voltage generated by the power supply and the generator is at least equal to a second predetermined voltage wherein voltages not exceeding the first predetermined voltage are voltages in an operating range of the control unit and the second predetermined voltage is an abnormal voltage.

The above transmission-ratio-varying steering apparatus also has a clamp means, which is electrically connected to the power supply, the generator and the power-providing means, and used for clamping the voltage generated by the power supply and the generator to a third predetermined voltage higher than the first predetermined voltage but lower than the second predetermined voltage and supplying the clamped voltage to the power-providing means when the voltage generated by the power supply and the generator is at least equal to the second predetermined voltage.

As described above, the transmission-ratio-varying steering apparatus has a clamp means which is used for clamping the voltage generated by the power supply and the generator to the third predetermined voltage higher than the first predetermined voltage but lower than the second predetermined voltage and supplying the clamped voltage to the power-providing means when the voltage generated by the power supply and the generator is at least equal to the second predetermined voltage. Thus, a surge voltage exceeding the second predetermined voltage is never supplied to the power-supplying means. Even if the generator outputs a surge voltage exceeding the second predetermined voltage, the power-supplying means is capable of discontinuing an operation to supply power to the control unit. Therefore, the storage supplementary means in the control unit is capable of storing an absolute angle computed by the rotation-angle computation means into the non-volatile storage means without the need to increase the size of the power-providing means.

In addition, in order to allow the clamp means to clamp a surge voltage higher than the second predetermined voltage to a voltage not exceeding the first predetermined voltage, that is, a voltage in the operating range of the control unit, the sizes of internal components and the like would have to be increased. However, the clamp means clamps a surge voltage higher than the second predetermined voltage to the third predetermined voltage, which is higher than the first predetermined voltage but lower than the second predetermined voltage. Thus, the need to increase the sizes of components in the clamp means and the like can be suppressed.

A transmission-ratio-varying steering apparatus according to a second aspect is characterized in that the clamp means has a switching device with its input terminal electrically connected to the power supply and the generator whereas its output terminal electrically connected to the power-providing means, wherein the voltage generated by the power supply and the generator is clamped to the third predetermined voltage in accordance with a switching operation of the switching device.

By this configuration, when the generator generates a surge voltage, the switching device in the clamp means carries out a switching operation to clamp the surge voltage generated by the generator to the third predetermined voltage.

In addition, a transmission-ratio-varying steering apparatus according to a third aspect is characterized in that the clamp means further has: a power accumulation means with its one end electrically connected to the output terminal of the switching device and the power-providing means whereas its other end electrically connected to the ground; and a switching-device drive means for driving the switching device to carry out a switching operation based on a voltage accumulated in the power accumulation means.

By this configuration, when the generator generates a surge voltage, a voltage accumulated in the power accumulation means rises. With the voltage of the power accumulation means rising, the switching-device drive means turns off the switching device, preventing the surge voltage from being accumulated in the power accumulation means. Thus, the voltage accumulated in the power accumulation means decreases due to discharging. As the voltage accumulated in the power accumulation means becomes equal to or lower than a predetermined voltage, the switching-device drive means turns on the switching device, causing the surge voltage to be accumulated again in the power accumulation means. With the surge voltage accumulated again in the power accumulation means, the switching-device drive means again turns off the switching device. In this way, the switching-device drive means drives the switching device to carry out switching operations based on a voltage accumulated in the power accumulation means. Thus, a surge voltage generated by the generator can be clamped to the third predetermined voltage.

In addition, a transmission-ratio-varying steering apparatus according to a fourth aspect is characterized in that the control unit is electrically connected to the switching device and used for generating a control signal for controlling switching operations by the switching device.

By this configuration, the control signal generated by the control unit can be used for driving the switching device to carry out switching operations for clamping a surge voltage generated by the generator to the third predetermined voltage.

In addition, a transmission-ratio-varying steering apparatus according to a fifth aspect further has: a linking means for linking the input shaft to the output shaft; an excitement coil for operating the linking means to cut linking between the input and output shafts; and a voltage detection means for detecting the voltage supplied by the power supply and the generator, wherein the control unit controls a current flowing through the excitement coil in order to operate the linking means, and when the voltage detected by the voltage detection means becomes at least equal to the second predetermined voltage, immediately halts an operation to drive the electric motor as well as the current flowing through the excitement coil and drives the storage supplementary means to store a rotation angle between the input and output shafts in the non-volatile storage means.

By this configuration, when the voltage detected by the voltage detection means becomes at least equal to the second predetermined voltage, the control unit is capable of immediately halting an operation to drive the electric motor as well as the current flowing through the excitement coil and driving the storage supplementary means to store an absolute angle into the non-volatile storage means. Thus, an abnormality of the generator can be detected and the operation of the transmission-ratio-varying steering apparatus can be normally terminated right away. As a result, the safety of the transmission-ratio-varying steering apparatus can be ensured.

In addition, a transmission-ratio-varying steering apparatus according to a sixth aspect further has: a linking means for linking the input shaft to the output shaft; an excitement coil for operating the linking means to cut linking between the input and output shafts; and a voltage detection means for detecting the voltage supplied by the power supply and the generator, wherein the control unit controls a current flowing through the excitement coil in order to operate the linking means, and when a state in which the voltage detected by the voltage detection means has been becoming at least equal to the second predetermined voltage has lapsed for a predetermined period of time, immediately halts an operation to drive the electric motor as well as the current flowing through the excitement coil and drives the storage supplementary means to store an absolute angle in the non-volatile storage means.

By this configuration, when a state in which the voltage detected by the voltage detection means is at least equal to the second predetermined voltage has lapsed for a predetermined period of time, the control unit is capable of immediately halting an operation to drive the electric motor as well as the current flowing through the excitement coil and driving the storage supplementary means to store an absolute angle in the non-volatile storage means. Thus, existence of an abnormality of the generator can be prevented from being determined mistakenly and the operation of the transmission-ratio-varying steering apparatus can be normally terminated. As a result, the reliability of the transmission-ratio-varying steering apparatus can be enhanced.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENTS

Figure 1:
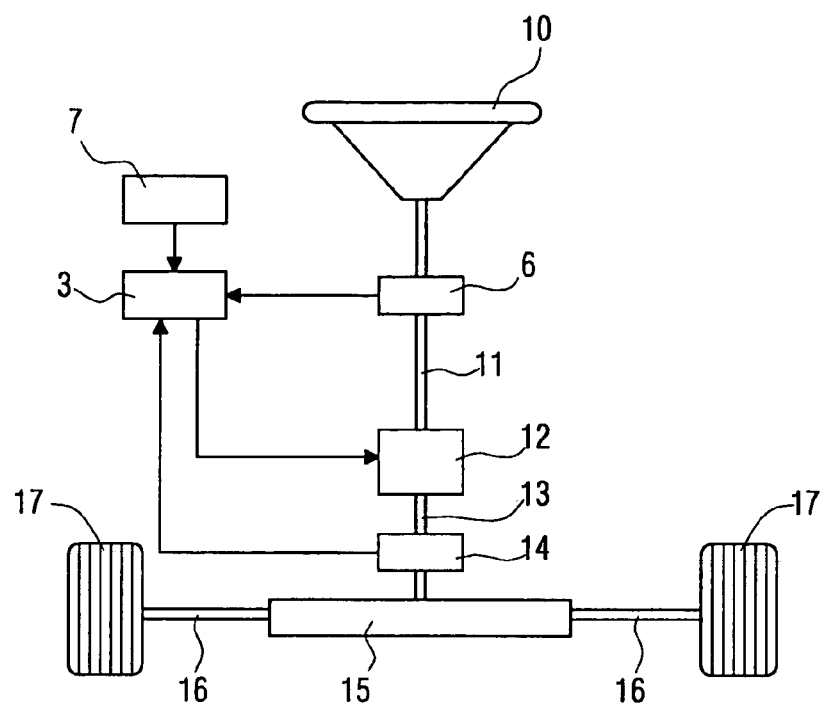
FIG. 1 is a diagram showing the configuration a transmission-ratio-varying steering apparatus in a vehicle.
Figure 2:
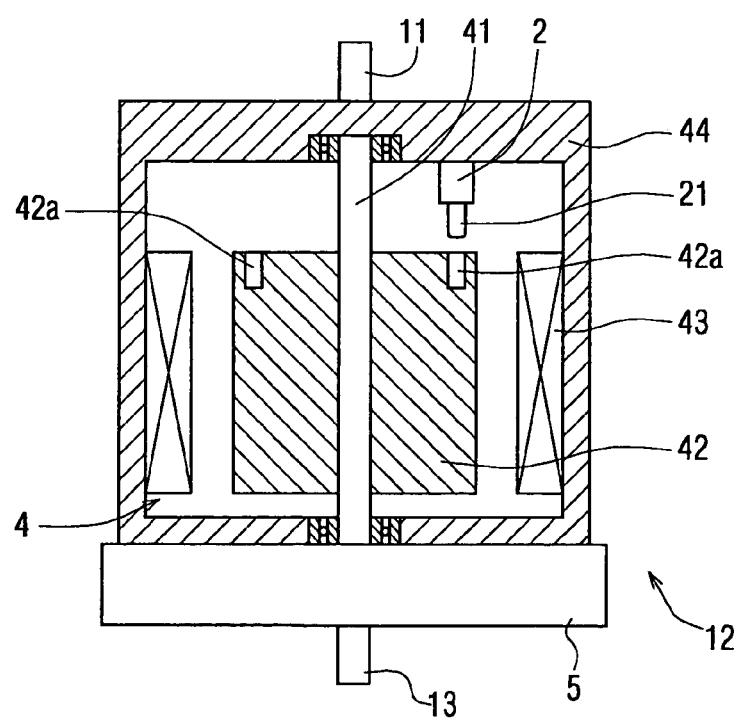
FIG. 2 is a diagram showing a cross section along an axial direction of a transmission-ratio-varying unit in the transmission-ratio-varying steering apparatus.
Figure 3:
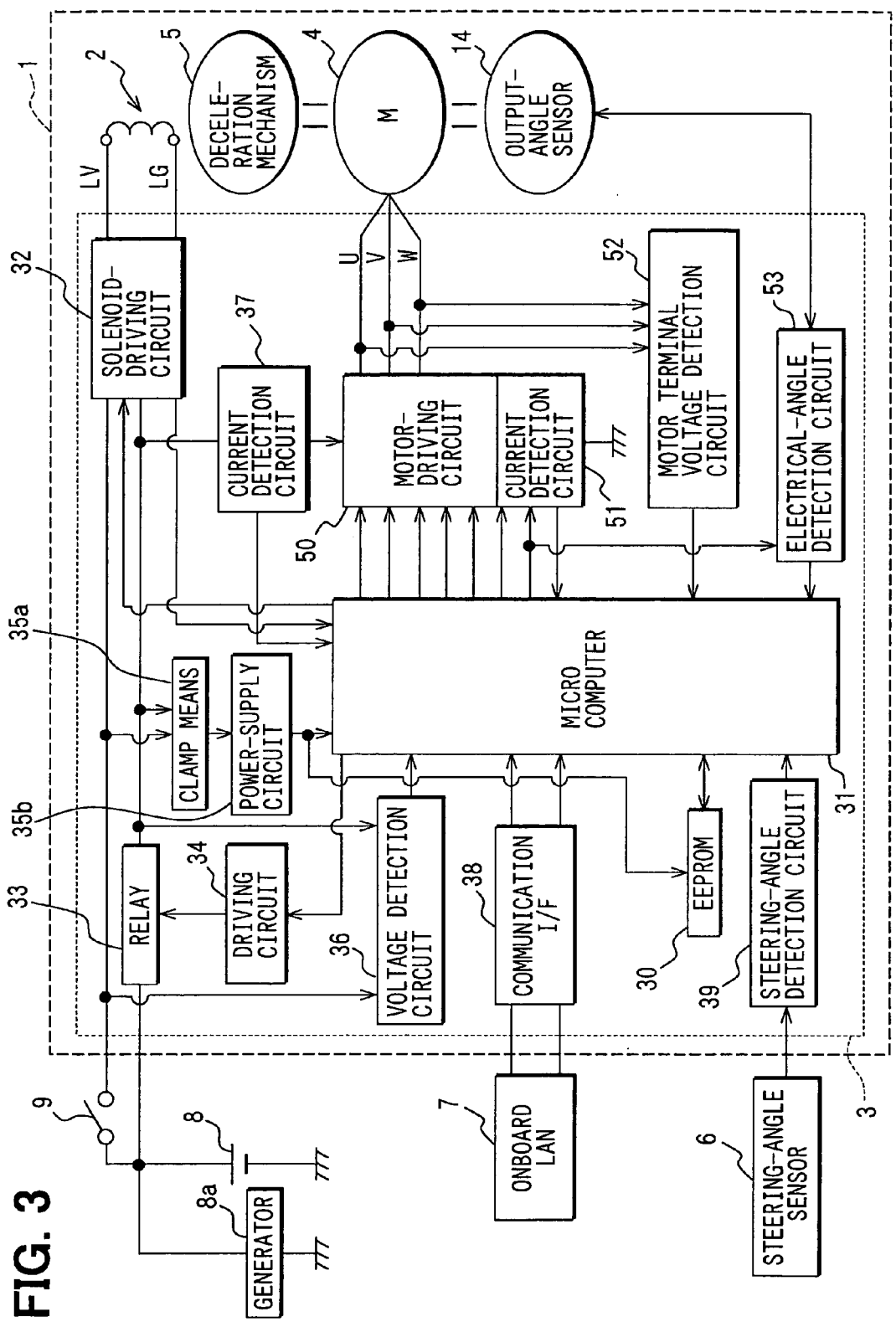
FIG. 3 is a block diagram showing the circuit configuration of the whole transmission-ratio-varying steering apparatus (implemented by a first embodiment)
Figure 4:
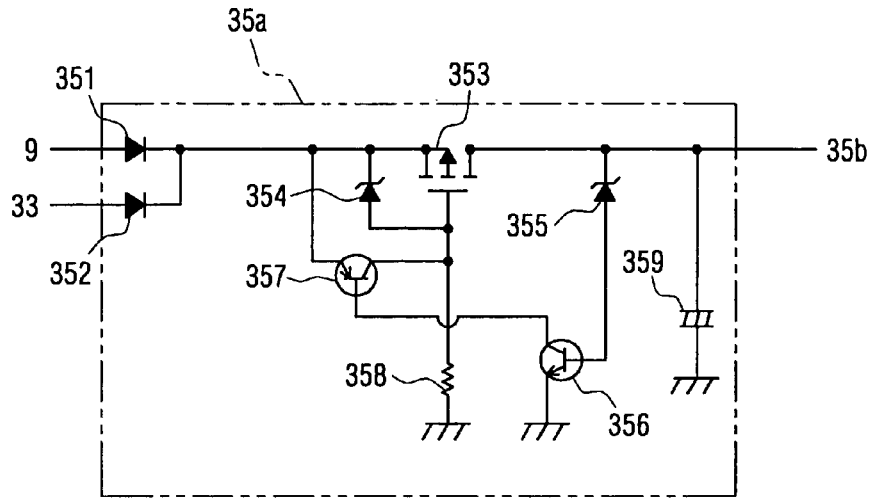
FIG. 4 is a diagram showing the circuit configuration of a power-supply circuit (provided by the first embodiment)
Figure 5:
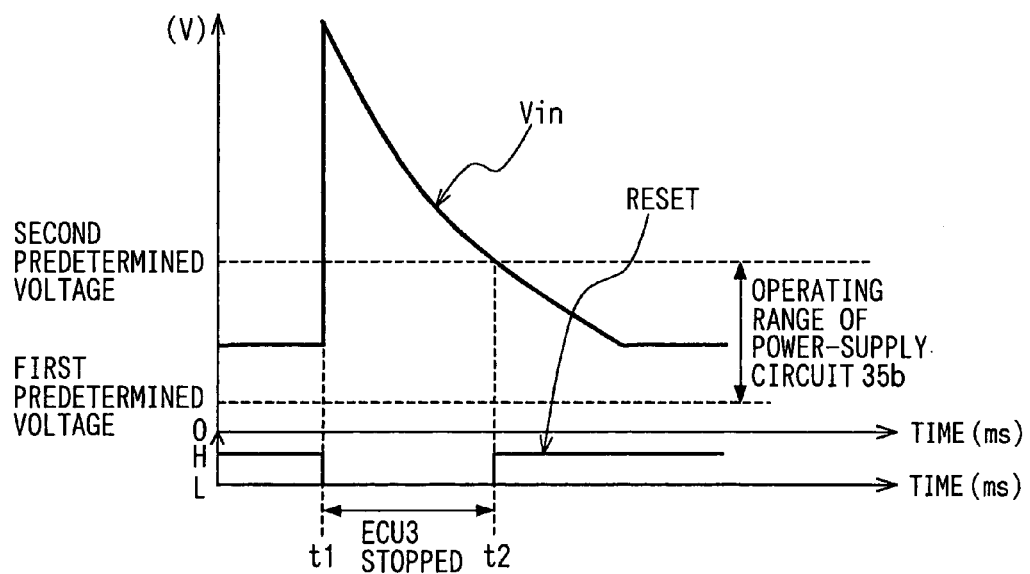
FIG. 5 shows a time-axis voltage waveform of an input voltage Vin, which is supplied to a clamp means when a generator generates a surge voltage (in the first embodiment)
Figure 6:
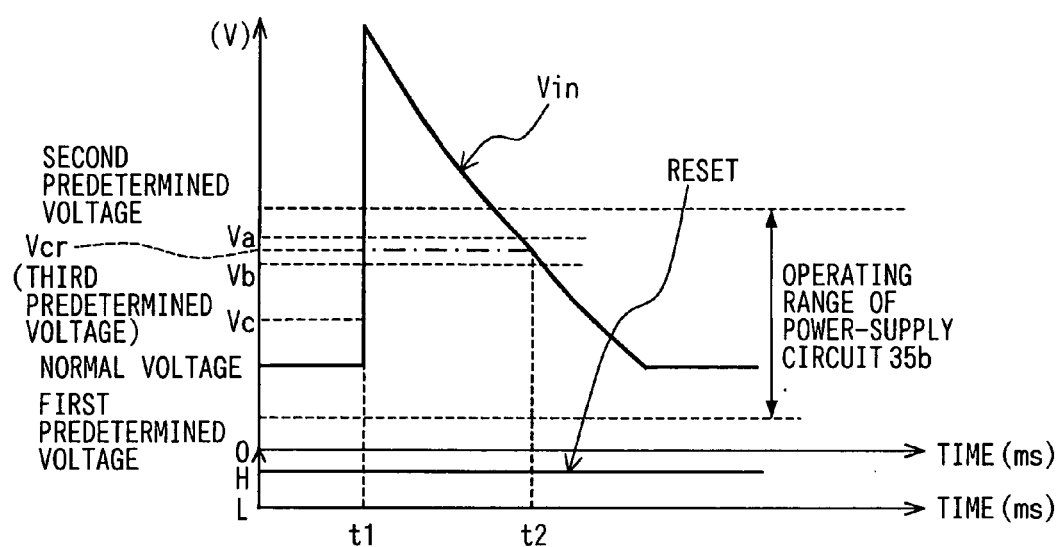
FIG. 6 shows a time-axis voltage waveform of a voltage, which is output by the clamp means to the power-supply circuit, as compared with a third predetermined voltage Vcr in the event of a surge voltage from the generator (in the first embodiment)

FIG. 1 is a diagram showing the configuration of a transmission-ratio-varying steering apparatus in a vehicle. FIG. 2 is a diagram showing a cross section along an axial direction of a transmission-ratio-varying unit 12 in the transmission-ratio-varying steering apparatus 1. FIG. 3 is a block diagram showing the circuit configuration of the whole transmission-ratio-varying steering apparatus 1 implemented by an embodiment, FIG. 4 is a diagram showing the circuit configuration of a power-supply circuit 35b provided by the embodiment. FIG. 5 shows a time-axis voltage waveform of an input voltage Vin, which is supplied to a clamp means, or adjusting means 35a, which is an adjusting device, when a generator 8a generates a surge voltage. FIG. 6 shows a time-axis voltage waveform of a voltage, which is output by the clamp means 35a to the power-supply circuit 35b, as compared with a third predetermined voltage Vcr in the event of a surge voltage from a generator 8a.

Referring to FIGS. 1 and 2, the overall configuration of a steering mechanism of a vehicle employing a transmission-ratio-varying steering apparatus 1, which changes the steering angle of the steered wheels in accordance with the speed of the vehicle, will be described and discussed. As shown in FIG. 1, the steering wheel 10 is linked to the upper end of an input shaft 11. The lower end of the input shaft 11 is connected to the upper end of an output shaft 13 by a transmission-ratio-varying unit 12. On the lower end of the output shaft 13, a pinion not shown in the figure is provided. The pinion is engaged with a rack 16 in a steering gear box 15. A steered wheel 17 is connected to each end of the rack 16 by a tire rod and an arm, which are not shown in the figure.

On the input shaft 11, a steering-angle sensor 6 is provided as a sensor for detecting the steering angle of the input shaft 11, that is, the steering angle of the steering wheel 10. On the output shaft 13, an output-angle sensor 14 is provided as a sensor for detecting the steering angle of the output shaft 13, that is, the steering angle of the steered wheels 17.

The steering-angle sensor 6 and the output-angle sensor 14 output steering angles of the steering wheel 10 and the steered wheels 17 respectively to an ECU 3. The ECU 3 also receives a vehicle-speed signal and an engine-speed signal from an onboard LAN 7. Based on the steering angles, the vehicle-speed signal and the engine-speed signal, the ECU 3 outputs a control signal for controlling the transmission-ratio-varying unit 12.

As shown in FIG. 2, the transmission-ratio-varying unit 12 comprises an electric motor 4, which may be a conventional brushless motor, and a deceleration mechanism 5. Based on the aforementioned control signal received from the ECU 3, the transmission-ratio-varying unit 12 rotates the electric motor 4 to change a relative angle between the input shaft 11 and the output shaft 13. The transmission-ratio-varying unit 12 also includes a relative-angle sensor not shown in the figure. The relative-angle sensor serves as relative-angle detection means for detecting the relative angle between the input shaft 11 and the output shaft 13. It should be noted that the output-angle sensor 14 can also be embedded in the transmission-ratio-varying unit 12 or provided as a sensor auxiliary to the relative-angle sensor. The electric motor 4 has a configuration comprising a stator 43 and a rotor 42, which are enclosed in a motor housing 44. On a steering-side inner circumference in the motor housing 44, a solenoid coil 2 is provided as a coil for advancing a linking pin 21 in a direction parallel to the axial direction of a rotating shaft 41 (the side of the deceleration mechanism 5 shown in FIG. 2). The solenoid coil 2 advances the linking pin 21 in a direction parallel to the axial direction of a rotating shaft 41 in accordance with a command received from the ECU 3. On an edge face of the rotor 42, an engagement unit 42a for engaging with the linking pin 21 is provided.

In the steering mechanism explained above, first of all, when the ECU 3 receives the vehicle-speed signal as well as the engine-speed signal from the onboard LAN 7, and a steering angle detected by the steering-angle sensor 6, the ECU 3 computes a target steering angle based on the vehicle-speed signal, the engine-speed signal, and the steering angle. Then, the ECU 3 outputs a control signal based on this target steering angle to the transmission-ratio-varying unit 12. In accordance with this control signal, the electric motor 4 in the transmission-ratio-varying unit 12 is driven to apply a steering angle corresponding to the target steering angle to the steered wheels 17. Then, the ECU 3 detects an actual steering angle of the steered wheels 17 by inputting a signal from the output-angle sensor 14 as part of execution of feedback control for applying a steering angle corresponding to the target steering angle to the steered wheels 17 with a high degree of reliability. At that time, the solenoid coil 2 is in an on state causing the linking pin 21 to retreat in a direction parallel to the axial direction of the rotating shaft 41 (the side of the deceleration mechanism 5 shown in FIG. 2). That is, the solenoid coil 2 is disengaged from the motor housing 44.

Next, the configuration of the transmission-ratio-varying steering apparatus 1 is explained by referring to FIG. 3. The transmission-ratio-varying steering apparatus 1 comprises the solenoid coil 2, the ECU 3, the electric motor 4, and the deceleration mechanism 5.

The solenoid coil 2 is an excitement coil connected to a solenoid-driving circuit 32 in the ECU 3. A driving signal from the solenoid-driving circuit 32 causes a current to flow from the solenoid-driving circuit 32 to actuate the linking pin 21.

The ECU 3 serves as a control unit for controlling currents flowing through the solenoid coil 2 and the electric motor 4 based on information received from the steering-angle sensor 6 and the onboard LAN 7. The ECU 3 comprises an EEPROM 30, a microcomputer 31, the solenoid-driving circuit 32, a relay 33, a driving circuit 34, the clamp means 35a, the power-supply circuit 35b, a voltage detection circuit 36, a current detection circuit 37, a communication I/F 38, a steering-angle detection circuit 39, a motor-driving circuit 50, a current detection circuit 51, a motor terminal voltage detection circuit 52 and a electrical-angle detection circuit 53.

The EEPROM 30 is a memory for storing a rotation angle (an absolute angle) between the input shaft 11 and the output shaft 13 which is outputted by a rotation-angle computation means of the microcomputer 31 to be described later.

Used as a control device, the microcomputer 31 receives information from the steering-angle sensor 6 and the onboard LAN 7. Based on the received information, the microcomputer 31 generates control signals for controlling currents flowing through the solenoid coil 2 and the electric motor 4. The microcomputer 31 comprises the rotation-angle computation means (not shown in the figure), a memory (not shown in the figure) and a storage supplementary means (not shown in the figure). The rotation-angle computation means is for receiving a relative angle between the input shaft 11 and the output shaft 13 detected by the relative-angle sensor and computing a rotation angle (an absolute angle) between the input shaft 11 and the output shaft 13 based on the input relative angle between the input shaft 11 and the output shaft 13. The memory is a component for storing the rotation angle computed by the rotation-angle computation means. The storage supplementary means is a means for writing the rotation angle stored in the memory into the EEPROM 30. It is to be noted that the storage supplementary means in the microcomputer 31 writes the rotation angle stored in the memory into the EEPROM 30 when the transmission-ratio-varying steering apparatus 1 is halted.

The solenoid-driving circuit 32 is a component for controlling a current flowing through the solenoid coil 2 based on a control signal from the microcomputer 31 in order to actuate the linking pin 21. The solenoid-driving circuit 32 is connected to the relay 33 through a battery 8.

The relay 33 is provided between the battery 8 and the solenoid-driving circuit 32. When the relay 33 is turned on, the battery 8 is connected to the solenoid-driving circuit 32. When the relay 33 is turned off, on the other hand, the battery 8 is disconnected from the solenoid-driving circuit 32.

The driving circuit 34 is a component for turning the relay 33 on or off in accordance with a signal received from the microcomputer 31.

Provided between two sides, i.e., the power-supply circuit 35b on one side and an IG switch 9 as well as a relay 33 on the other side, the clamp means 35a is a component for clamping a voltage from a power source. In this embodiment the power source is a battery 8 and a generator 8a. The clamp means 35a will be described more fully later.

The power-supply circuit 35b is connected to the battery 8 through the clamp means 35a and the IG switch 9 or the relay 33. The power-supply circuit 35b is a component for clamping a power generated by the battery 8 to a voltage lower than an upper limit (referred to hereafter as a first predetermined voltage) of an operating range of the EEPROM 30 as well as the microcomputer 31 and supplying a clamped first predetermined voltage to the EEPROM 30 as well as the microcomputer 31. In addition, the power-supply circuit 35b also has a self-protection function for cutting off power being supplied to the microcomputer 31 (by turning off a RESET signal serving as its own operation signal) when a voltage output by the clamp means 35a becomes equal to or higher than an upper limit of an operating voltage of the the power-supply circuit 35b (equal to or higher than a second predetermined voltage) as shown in FIG. 5.

The voltage detection circuit 36 is a component for detecting the value of a voltage output by the battery 8 and supplying the detected voltage value to the microcomputer 31.

The current detection circuit 37 is a component for passing a current from the battery 8 to the motor-driving circuit 50, detecting the value of the current, and supplying the detected current value to the microcomputer 31.

The communication I/F 38 is a component for converting the vehicle-speed signal and the engine-speed signal, which are received from the onboard LAN 7, into quantities recognizable by the microcomputer 31 and supplying the converted vehicle-speed signal and the converted engine-speed signal to the microcomputer 31. The communication I/F 38 is connected to the battery 8 by the IG switch 9 even though this connection is not shown in the figure.

The steering-angle detection circuit 39 is a component for converting a signal received from the steering-angle sensor 6 into a quantity recognizable by the microcomputer 31 and supplying the converted signal to the microcomputer 31. The steering-angle detection circuit 39 is connected to the battery 8 by the IG switch 9 even though this connection is not shown in the figure.

The motor-driving circuit 50 is provided with six switching transistors forming a three-phase bridge circuit. The motor-driving circuit 50 is a component for driving the electric motor 4 by executing duties of the six switching transistors in accordance with a control signal received from the microcomputer 31.

The current detection circuit 51 is a component for detecting currents flowing through the six switching transistors in the motor-driving circuit 50 and supplying the detected current values to the microcomputer 31.

The motor terminal voltage detection circuit 52 is a component for detecting voltages of the six switching transistors in the motor-driving circuit 50 and supplying the detected voltage values to the microcomputer 31.

The electrical-angle detection circuit 53 is a component for converting a signal received from the output-angle sensor 14 into a quantity recognizable by the microcomputer 31 and supplying the converted signal to the microcomputer 31. The output-angle sensor 14 is connected to the deceleration mechanism 5 by the output shaft 13.

Next, the circuit configuration of the clamp means 35a will be explained by referring to FIGS. 4 to 6.

As shown in FIG. 4, the clamp means 35a comprises diodes 351 and 352, a switching transistor 353, Zener diodes 354 and 355, transistors 356 and 357, a resistor 358 and a capacitor 359.

The input side of the diode 351 is connected to the IG switch 9 and its output side is connected to the switching transistor 353. The diode 351 receives a voltage from the battery 8 and the generator 8a (such as an alternator) through the IG switch 9.

The input side of the diode 352 is connected to the relay 33 and its output side is connected to the switching transistor 353. The diode 352 receives a voltage from the battery 8 and the generator 8a (such as an alternator) through the relay 33.

The input terminal of the switching transistor 353 is connected to the output sides of the diodes 351 and 352 and its output terminal is connected to the power-supply circuit 35b. The gate of the switching transistor 353 is connected to the ground by the resistor 358 and to the collector of the transistor 357. When a voltage is applied to the gate of the switching transistor 353, the switching transistor 353 is turned off.

The Zener diode 354 is for protecting the switching transistor 353 from a surge voltage, and provided between the input terminal and gate of the switching transistor 353.

The Zener diode 355 is provided between the output terminal of the switching transistor 353 and the base of the transistor 356. When the output voltage appearing at the output terminal of the switching transistor 353 exceeds a predetermined level, the transistor 356 is turned on.

The emitter of the transistor 356 is connected to the ground and its collector is connected to the base of the transistor 357.

The emitter of the transistor 357 is connected to the output sides of the diodes 351 and 352 as well as the input terminal of the switching transistor 353. As described above, the collector of the transistor 357 is connected to the gate of the switching transistor 353.

One of the ends of the resistor 358 is connected to the gate of the switching transistor 353 and the other end is connected to the ground.

The capacitor 359 serves as a power accumulation means. One of the ends of the capacitor 359 is connected to the output terminal of the switching transistor 353 and one of the ends of the Zener diode 355, whereas the other end of the capacitor 359 is connected to the ground. The capacitor 359 accumulates a voltage appearing at the output terminal of the switching transistor 353.

The transistors 356 and 357 as well as the Zener diode 355 drive the switching transistor 353 to carry out switching operations and function as a switching-device drive means.

Next, the operation of the clamp means 35a is explained.

During normal operation, when no surge voltage is generated by the generator 8a, the transistor 357 is in an off state while the switching transistor 353 is in an on state. Thus, an input voltage Vi from the battery 8 and the generator 8a is supplied to the power-supply circuit 35b without being clamped. It should be noted that the normal time when no surge voltage is generated by the generator 8a is a time at which the input voltage Vi output by the battery 8 and the generator 8a to the clamp means 35a is lower than a second predetermined voltage, which is the maximum voltage of the operating range of the power-supply circuit 35b.

A surge voltage, which will be referred to as a G pulse (giant pulse), may be generated by the generator 8a when a terminal of the battery 8 is loosened during vehicle travel motion or due to another cause. In this case, the input voltage Vi from the battery 8 and the generator 8a exceeds the second predetermined voltage as shown in FIG. 5 (at a time t1 shown in FIG. 5). At that time, since the switching transistor 353 is in an on state, an output voltage appearing at the output terminal of the switching transistor 353 of the clamp means 35a rises abruptly. In addition, a voltage higher than the second predetermined voltage is accumulated in the capacitor 359. Thus, since a voltage applied to the Zener diode 355 increases, the transistor 356 is turned on, turning the transistor 357 on as well. In this state, a voltage is applied to the gate of the switching transistor 353, turning the switching transistor 353 off. As a result, an output voltage no longer appears at the output terminal of the switching transistor 353. At that time, since the switching transistor 353 is in an off state, a voltage accumulated in the capacitor 359 at a level higher than the second predetermined voltage is discharged, becoming lower with the lapse of time. Thus, a voltage applied to the Zener diode 355 also becomes lower as well. As the voltage applied to the Zener diode 355 also becomes equal to or lower than a predetermined voltage (such as the second predetermined voltage), the transistor 356 is turned off, turning the transistor 357 off as well. In this state, no voltage is applied to the gate of the switching transistor 353 anymore. As a result, the switching transistor 353 is turned on again, causing an output voltage to appear at its output terminal.

The clamp means 35a repeatedly carries out the operations described above to clamp the input voltage Vi from a level higher than the second predetermined voltage to a voltage Vcr (a third predetermined voltage) lower than the second predetermined voltage but higher than the first predetermined voltage as shown in FIG. 6, and the clamp means 35a outputs the clamped voltage to the power-supply circuit 35b (Refer to a period between the time t1 and a time t2 in FIG. 6). That is, the clamp means 35a clamps the input voltage Vi to a voltage in an operating range of the power-supply circuit 35b and outputs the clamped voltage to the power-supply circuit 35b.

EFFECTS OF THE FIRST EMBODIMENT

In the conventional transmission-ratio-varying steering apparatus, when a surge voltage generated by the generator 8a at a level higher than the second predetermined voltage as shown in FIG. 5 is supplied directly (at the time t1) to the power-supply circuit 35b, a self-protection function of the power-supply circuit 35b switches its own operation signal serving as a RESET signal from H to L to cut off power being supplied to the microcomputer 31 and the EEPROM 30. With power no longer supplied to the microcomputer 31 and the EEPROM 30, the storage supplementary means of the microcomputer 31 is not capable of transferring the rotation angle between the input shaft 11 and the output shaft 13 from the memory to the EEPROM 30 (during the period between the times t1 and t2).

In the transmission-ratio-varying steering apparatus 1 implemented by this embodiment, however, the clamp means 35a is provided between two sides, i.e., the battery 8 as well as the generator 8a on one side and the power-supply circuit 35b on the other side. The clamp means 35a serves as a means for clamping a surge voltage higher than the second predetermined voltage to the third predetermined voltage (Vcr), which is higher than the first predetermined voltage but lower than the second predetermined voltage. Thus, a surge voltage higher than the second predetermined voltage is never supplied to the power-supply circuit 35b directly. As a result, even if a surge voltage higher than the second predetermined voltage is generated by the generator 8a, the self-protection function of the power-supply circuit 35b can be prevented from cutting off power being supplied to the microcomputer 31 and the EEPROM 30. Therefore, the storage supplementary means of the microcomputer 31 is always capable of transferring the rotation angle between the input shaft 11 and the output shaft 13 from the memory to the EEPROM 30. Accordingly, a reliable transmission-ratio-varying steering apparatus 1 can be provided.

In addition, in order to clamp a surge voltage higher than the second predetermined voltage to a level equal to or lower than the first predetermined voltage in the operating range of the microcomputer 31, a large-size Zener diode 355 as well as large-size transistors 356 and 357 would be required. However, the clamp means 35a provided by this embodiment merely clamps a surge voltage higher than the second predetermined voltage to the third predetermined voltage (Vcr), which is higher than the first predetermined voltage but lower than the second predetermined voltage. Thus, factors causing the size of the clamp means and the cost to increase can be suppressed.

SECOND EMBODIMENT

Figure 7:
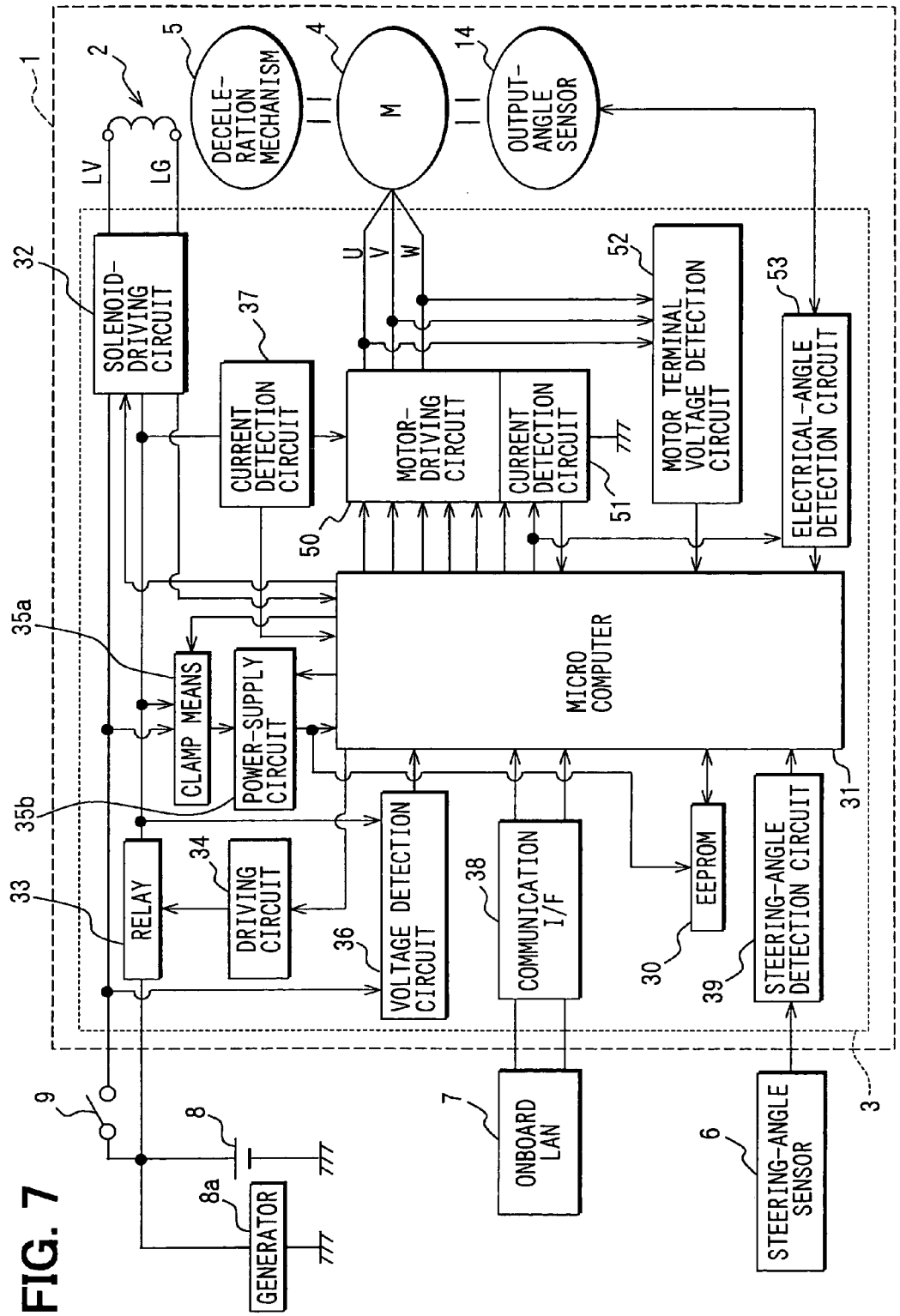
FIG. 7 is a block diagram showing a circuit configuration of the whole transmission-ratio-varying steering apparatus (implemented by a second embodiment)
Figure 8:
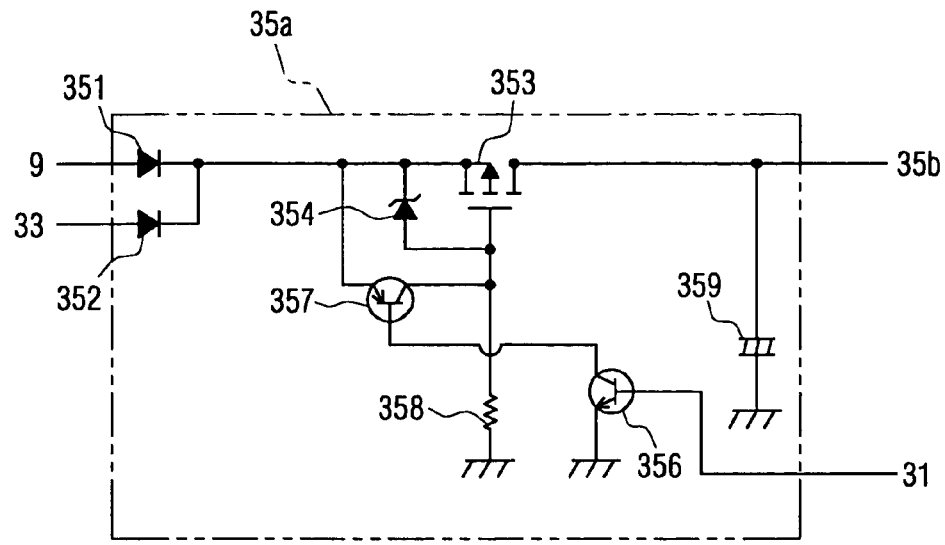
FIG. 8 is a circuit diagram showing a circuit configuration of a clamp means (provided by the second embodiment)

FIG. 7 is a block diagram showing a circuit configuration of the transmission-ratio-varying steering apparatus 1 implemented by a second embodiment. FIG. 8 is a circuit diagram showing a circuit configuration of a clamp means 35a provided by the embodiment. In the following description, explanations of components identical with those of the first embodiment are omitted. That is, only differences are explained.

As shown in FIGS. 7 and 8, in this embodiment, the microcomputer 31 is connected to the base of the transistor 356 in the clamp means 35a and supplies a control signal to the base in order to drive the transistor 356 to carry out switching operations. That is, the microcomputer 31 generates the control signal for turning the transistor 356 on and off. In addition, the microcomputer 31 has a power-supply circuit voltage detection means (not shown in the figures) for detecting a voltage supplied by the clamp means 35a to the power-supply circuit 35b.

It should be noted that, since the base of the transistor 356 is connected to the microcomputer 31, the Zener diode 355 in the first embodiment is eliminated.

Next, the operation of the microcomputer 31 is explained.

During normal operation, when no surge voltage generated by the generator 8a, a voltage supplied from the voltage detection circuit 36 to the microcomputer 31 does not exceed the second predetermined voltage. In this state, the microcomputer 31 generates a control signal for turning off the transistor 356 and outputs the control signal to the base of the transistor 356. Thus, since the transistor 356 is turned off, the transistor 357 is also turned off as well and no voltage is therefore applied to the gate of the switching transistor 353. As a result, the switching transistor 353 is turned on, and the input voltage Vi from the battery 8 and the generator 8a is passed to the power-supply circuit 35b without clamping the voltage Vi.

A surge voltage referred to as a G pulse (giant pulse) may be generated by the generator 8a when a terminal of the battery 8 is loosened in the course of a travel motion of the vehicle or due to another cause. In this case, the input voltage Vi from the battery 8 and the generator 8a exceeds the second predetermined voltage as shown in FIG. 5. At that time, based on a signal generated by the voltage detection circuit 36, the microcomputer 31 determines that the input voltage Vi exceeds the second predetermined voltage and generates a control signal for turning on the transistor 356 and outputs the control signal to the base of the transistor 356. Thus, since the transistor 356 is turned on, the transistor 357 is also turned on as well, applying a voltage to the gate of the switching transistor 353. As a result, the switching transistor 353 is turned off, so that a voltage no longer appears at the output terminal of the switching transistor 353. At that time, since the switching transistor 353 is in an off state, a voltage accumulated in the capacitor 359 at a level higher than the second predetermined voltage is discharged, becoming lower with the lapse of time. Thus, a voltage supplied by the clamp means 35a to the power-supply circuit 35b also decreases as well. As the microcomputer 31 determines that the voltage supplied by the clamp means 35a to the power-supply circuit 35b becomes lower than a predetermined voltage (such as the second predetermined voltage) based on a signal generated by the power-supply circuit voltage detection means, the microcomputer 31 generates a control signal for turning off the transistor 356 and outputs the control signal to the base of the transistor 356. Thus, since the transistor 356 is turned off, the transistor 357 is also turned off as well and voltage is therefore no longer applied to the gate of the switching transistor 353. As a result, the switching transistor 353 is turned on again, generating an output voltage at the output terminal.

The microcomputer 31 repeatedly carries out the operations described above to clamp the input voltage Vi from a level higher than the second predetermined voltage to a voltage Vcr (a third predetermined voltage) lower than the second predetermined voltage but higher than the first predetermined voltage as shown in FIG. 6. That is, the microcomputer 31 controls the clamp means 35a to clamp the input voltage Vi from a level higher than the second predetermined voltage to a voltage in an operating range of the power-supply circuit 35b and outputs the clamped voltage to the power-supply circuit 35b.

As described above, because of the operations performed by the microcomputer 31, this embodiment is capable of clamping the input voltage Vi from a level higher than the second predetermined voltage to a voltage Vcr (a third predetermined voltage) lower than the second predetermined voltage but higher than the first predetermined voltage. Thus, the same effects as the first embodiment can be exhibited.

THIRD EMBODIMENT

Figure 9:
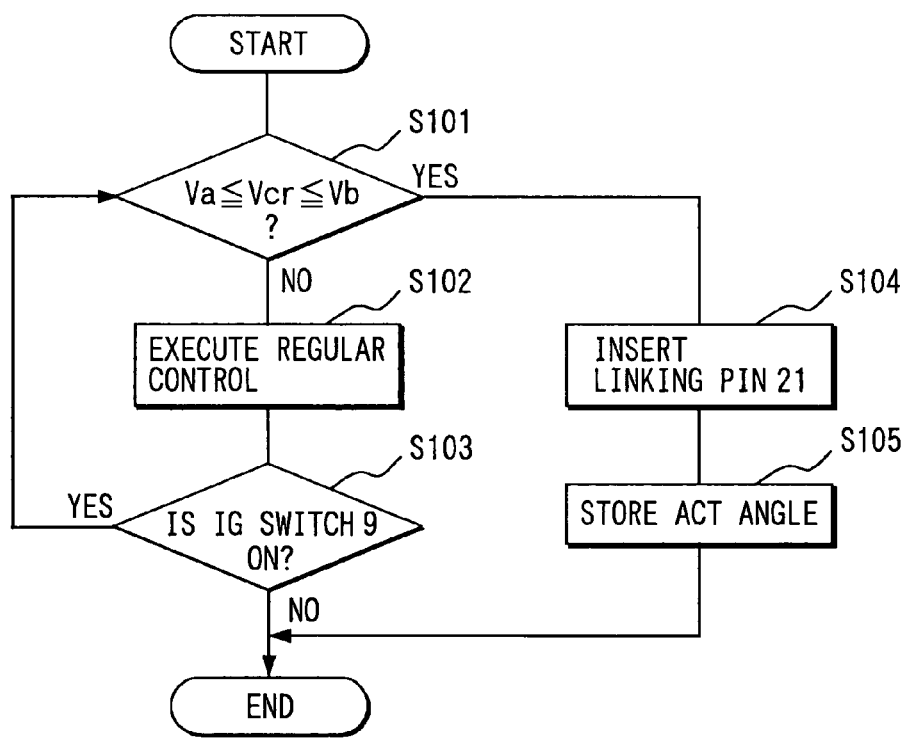
FIG. 9 shows a flowchart representing a processing procedure executed by the microcomputer in the event of a surge voltage from the generator (in a third embodiment)

FIG. 9 shows a flowchart representing a processing procedure executed by the microcomputer 31 in the event of a surge voltage from the generator 8a in a third embodiment.

The operation of the microcomputer 31 in this embodiment is explained by referring to the flowchart shown in FIG. 9. It should be noted that flowchart described in this embodiment can also be incorporated in the first or second embodiment.

At Step 101, the power-supply circuit voltage detection means detects a voltage supplied by the clamp means 35a to the power-supply circuit 35b to determine whether or not the detected voltage is the third predetermined voltage Vcr, that is, whether or not the generator 8a has generated a surge voltage.

This approach is taken because components such as the transistors 356 and 357 in the clamp means 35a clamp the surge voltage to the third predetermined voltage Vcr when the generator 8a generates a surge voltage. Considering characteristic variations of the components such as the transistors 356 and 357 in the clamp means 35a, the third predetermined voltage Vcr is assumed to have a value in a range between a first threshold voltage Va and a second threshold voltage Vb as shown in FIG. 6. Thus, at this step, the power-supply circuit voltage detection means determines whether or not the voltage supplied by the clamp means 35a to the power-supply circuit 35b is in this range. When the voltage does not exceed the first threshold voltage Va and is at least equal to the second threshold voltage Vb, the voltage is determined to be a surge voltage clamped to the third predetermined voltage Vcr. In this case, the flow of the processing procedure goes on to Step 104. When the voltage does not exceed the first threshold voltage Va or is not at least equal to the second threshold voltage Vb, on the other hand, the voltage is determined to be not a surge voltage clamped to the third predetermined voltage Vcr. In this case, the flow of the processing procedure goes on to Step 102.

As described above, when the determination result obtained at Step 101 indicates that the third predetermined voltage Vcr does not exceed the first threshold voltage Va or is not at least equal to the second threshold voltage Vb, the generator 8a is determined not to have generated a surge voltage, and the flow of the processing procedure goes on to Step 102 at which the switching transistor 353 in the clamp means 35a is turned on to execute regular control. It is to be noted that, to put it concretely, a control signal for turning off the transistor 356 is generated and output to the transistor 356. Then, the flow of the processing procedure goes on to Step 103.

At Step 103, the IG switch 9 is examined to determine whether or not the IG switch 9 has been turned on. When the IG switch 9 has been turned on, the flow of the processing procedure goes back to Step 101. When the IG switch 9 has been turned off, the execution of the processing procedure is ended.

As described above, when the determination result obtained at Step 101 indicates that the third predetermined voltage Vcr does not exceed the first threshold voltage Va and is at least equal to the second threshold voltage Vb, the generator 8a is determined to have a generated surge voltage, the flow of the processing procedure goes on to Step 104 at which the flow of a current to the solenoid coil 2 is stopped immediately to insert the linking pin 21 into the engagement unit 42a. With the linking pin 21 inserted into the engagement unit 42a, the input shaft 11 is linked to the output shaft 13. Then, the flow of the processing procedure goes on to Step 105. It is to be noted that, at that time, the operation to flow a current into the electric motor 4 to drive the electric motor 4 is stopped.

At Step 105, the storage supplementary means transfers a rotation angle (an absolute angle) between the input shaft 11 and the output shaft 13 from the memory to the EEPROM 30 before the execution of the processing procedure is ended.

As described above, when the microcomputer 31 in the transmission-ratio-varying steering apparatus 1 implemented by this embodiment determines that the third predetermined voltage Vcr is supposed to have a value that does not exceed the first threshold voltage Va and is at least equal to the second threshold voltage Vb, the generator 8a is determined to have generated a surge voltage. In this case, the flow of a current to the solenoid coil 2 is stopped immediately to insert the linking pin 21 into the engagement unit 42a. In addition, the storage supplementary means transfers a rotation angle (an absolute angle) between the input shaft 11 and the output shaft 13 from the memory to the EEPROM 30. Thus, the safety of the transmission-ratio-varying steering apparatus 1 can be ensured to cope with a surge voltage generated by the generator 8a.

FOURTH EMBIDIMENT

Figure 10:
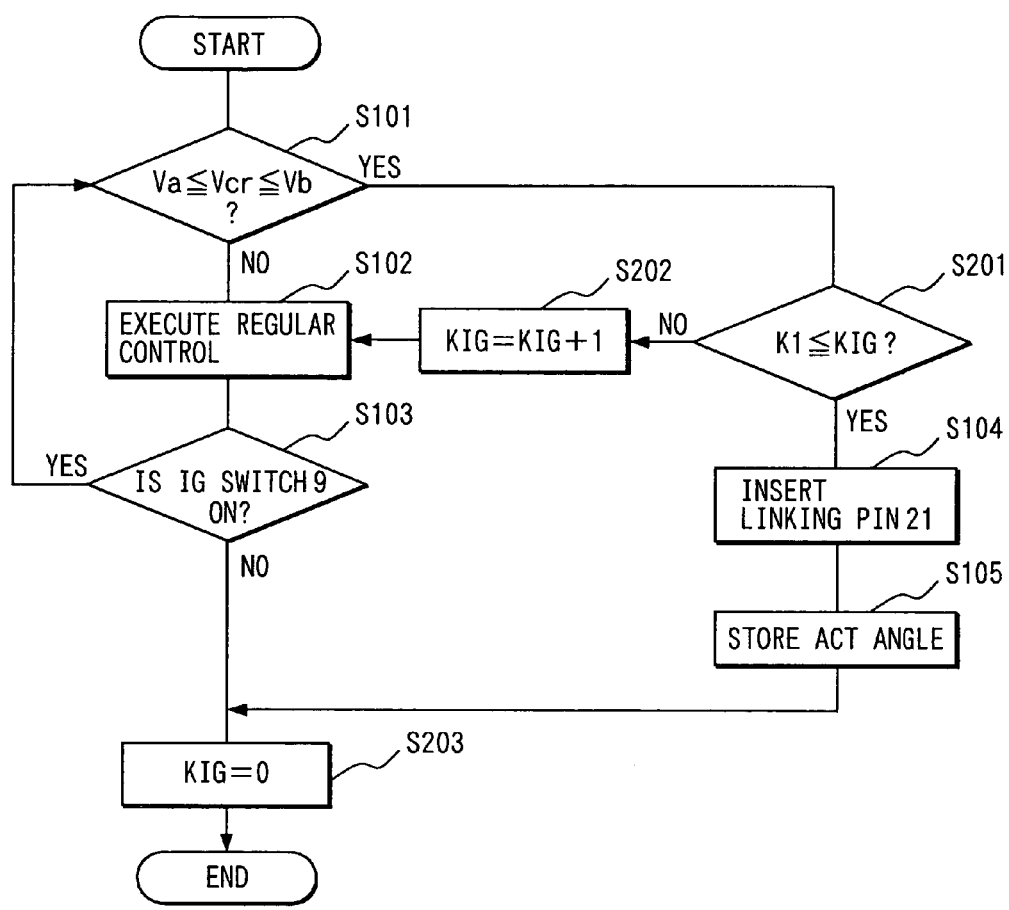
FIG. 10 shows a flowchart representing a processing procedure executed by the microcomputer in the event of a surge voltage from the generator (in a fourth embodiment)

FIG. 10 shows a flowchart representing a processing procedure executed by the microcomputer 31 in the event of a surge voltage from the generator 8a in a fourth embodiment. It should be noted that this embodiment can be incorporated in the first or second embodiment.

As shown in FIG. 10, in this embodiment, Steps 201 to S203 are added to the flowchart shown in FIG. 9.

When the determination result obtained at Step 101 indicates that the third predetermined voltage Vcr does not exceed the first threshold voltage Va and is not at least equal to the second threshold voltage Vb, the generator 8a is determined not to have generated a surge voltage, and the flow of the processing procedure goes on to Step 201 to determine whether or not a counter KIG has a value at least equal to a predetermined counter value K1. When the counter KIG has a value at least equal to the predetermined counter value K1, the flow of the processing procedure goes on to Step 104. When the counter KIG has a value smaller than the predetermined counter value K1, on the other hand, the flow of the processing procedure goes on to Step 202. The counter value K1 is set to a predetermined value in advance.

At Step 202, the counter KIG is incremented because the determination result obtained at Step 201 indicates that the counter KIG has a value smaller than the predetermined counter value K1. Then, the flow of the processing procedure goes on to Step 102.

At Step 203, the counter KIG is initialized at 0. Then, the execution of the processing procedure is ended.

As described above, when the microcomputer 31 in the transmission-ratio-varying steering apparatus 1 implemented by this embodiment determines that the third predetermined voltage Vcr is supposed to have a value that does not exceed the first threshold voltage Va and is at least equal to the second threshold voltage Vb, the generator 8a is determined to have generated a surge voltage. In this case, regular control is continued until the counter KIG is incremented to a value at least equal to a counter value K1 set in advance. As the counter KIG reaches the value at least equal to the counter value K1, the flow of a current to the solenoid coil 2 is stopped to insert the linking pin 21 into the engagement unit 42a. That is, the microcomputer 31 stops the flow of a current to the solenoid coil 2 to insert the linking pin 21 into the engagement unit 42a after the state, in which the third predetermined voltage Vcr between the first threshold voltage Va and the second threshold voltage Vb, has been lapsing for a predetermined period of time. In addition, the storage supplementary means transfers a rotation angle (an absolute angle) between the input shaft 11 and the output shaft 13 from the memory to the EEPROM 30. In this way, generation of a surge voltage from the generator 8a can be prevented from being determined incorrectly by the microcomputer 31. As a result, the reliability of the transmission-ratio-varying steering apparatus 1 can be ensured.

FIFTH EMBIDIMENT

Figure 11:
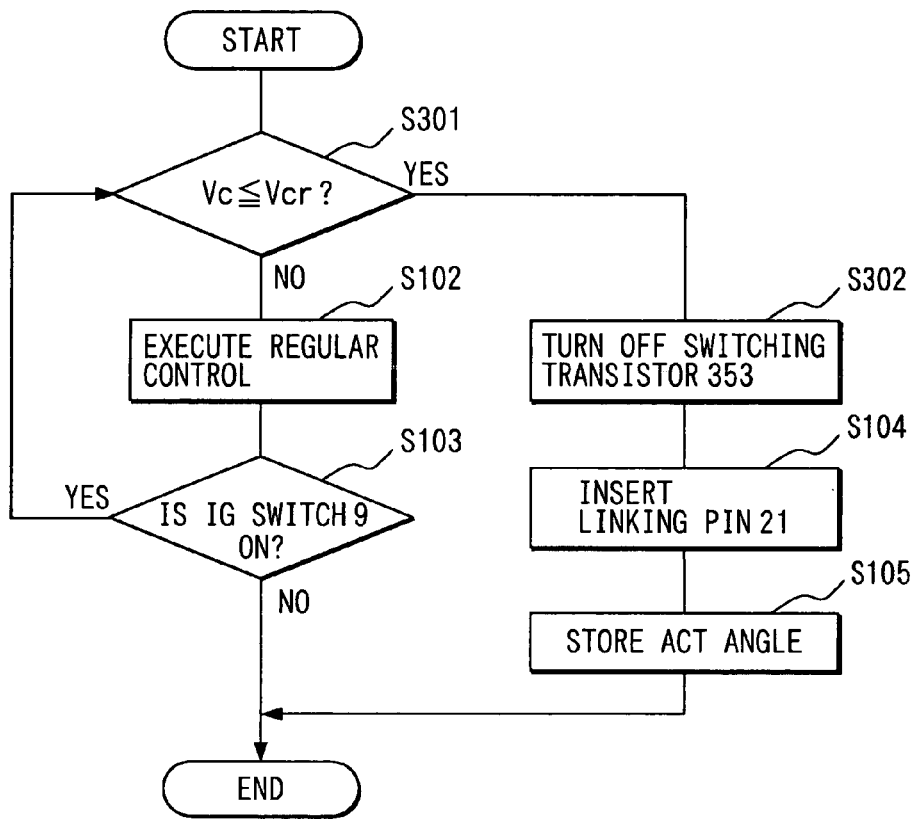
FIG. 11 shows a flowchart representing a processing procedure executed by the microcomputer in the event of a surge voltage from the generator (in a fifth embodiment).

FIG. 11 shows a flowchart representing a processing procedure executed by the microcomputer 31 in the event of a surge voltage from the generator 8a in a fifth embodiment. It is to be noted that this embodiment can be incorporated in the second embodiment only.

The operation of the microcomputer 31 in this embodiment is explained by referring to the flowchart shown in FIG. 11.

As shown in FIG. 11, in this embodiment, Step 101 of the flowchart shown in FIG. 9 is changed to Step 301 and Step 302 is added to the flowchart shown in FIG. 9.

The third predetermined voltage Vcr is supposed to have a value at least equal to a third threshold voltage Vcr. Thus, at Step 301, a voltage generated by the clamp means 35a is examined to determine whether or not the voltage is at least equal to the third threshold voltage Vcr. When the voltage is at least equal to the third threshold voltage Vcr, the flow of the processing procedure goes on to Step 302. When the voltage is lower than the third threshold voltage Vcr, on the other hand, the flow of the processing procedure goes on to Step 102.

As shown in FIG. 6, the third threshold voltage Vc is set at a voltage lower than the second threshold voltage Vb but higher than the normal voltage not clamped by the clamp means 35a.

As described above, when the determination result obtained at Step 301 indicates that the third predetermined voltage Vcr is at least equal to the third threshold voltage Vc, generation of a surge voltage by the generator 8a is inferred. In this case, the flow of the processing procedure goes on to Step 302 at which a control signal for turning off the switching transistor 353 in the clamp means 35a is output to the transistor 356. Then, the flow of the processing procedure goes on to Step 104.

It is to be noted that, while a voltage from the battery 8 and the generator 8a is no longer supplied to the power-supply circuit 35b, a voltage accumulated in the capacitor 359 in the clamp means 35a is supplied to the microcomputer 31 and the EEPROM 30 by way of the power-supply circuit 35b.

Then, as described above, at Step 104, the flow of a current to the solenoid coil 2 is stopped immediately to insert the linking pin 21 into the engagement unit 42a. Subsequently, at Step 105, the storage supplementary means transfers a rotation angle (an absolute angle) between the input shaft 11 and the output shaft 13 from the memory to the EEPROM 30.

As described above, when a voltage generated by the clamp means 35a is determined to be the third predetermined voltage Vcr, which is at least equal to the third threshold voltage Vc, generation of a surge voltage by the generator 8a is inferred. In this case, a control signal for turning off the switching transistor 353 in the clamp means 35a is output to the transistor 356, so that the flow of a current to the solenoid coil 2 is stopped immediately to insert the linking pin 21 into the engagement unit 42a. Subsequently, at Step 105, the storage supplementary means transfers a rotation angle (an absolute angle) between the input shaft 11 and the output shaft 13 from the memory to the EEPROM 30. In this way, the microcomputer 31 infers generation of a surge voltage by the generator 8a, allowing the transmission-ratio-varying steering apparatus 1 to be stopped at a time earlier than the configuration of the third embodiment. Thus, the safety of the transmission-ratio-varying steering apparatus 1 can be ensured.

In addition, with a control signal for turning off the switching transistor 353 of the clamp means 35a output to the transistor 356, a voltage from the battery 8 and the generator 8a is no longer supplied to the power-supply circuit 35b but a voltage accumulated in the capacitor 359 in the clamp means 35a is supplied to the microcomputer 31 and the EEPROM 30, so that the storage supplementary means in the microcomputer 31 is capable of transferring a rotation angle (an absolute angle) between the input shaft 11 and the output shaft 13 from the memory to the EEPROM 30.

Therefore, the present disclosure concerns a transmission-ratio-varying steering apparatus that includes a clamp device disposed between a generator and a power supply circuit for clamping a surge voltage generated by the generator to a clamped voltage that is within an operating range of the power-supply circuit 35b and for outputting the clamped voltage to the power-supply circuit 35b, wherein the surge voltage is higher than a second predetermined voltage, wherein the clamped voltage is set to be a third predetermined voltage that is higher than a first predetermined voltage and lower than the second predetermined voltage. The clamp device includes a switching device 353 for switching to a first state (off state) when an output voltage at an output terminal of the switching device exceeds the second predetermined voltage and switching to a second state (on state) when the output voltage is less than or equal to the second predetermined voltage.

The clamp device includes an output capacitor 359 for accumulating the output voltage at the output terminal of the switching device. In a first embodiment, the switching device switches to the second state when the output voltage accumulated in the capacitor has dissipated. In a second embodiment, the switching device 353 switches between the first state and the second state based upon a control signal received from a microcomputer, wherein the microcomputer determines if the output voltage at the output terminal of the switching device exceeds the second predetermined voltage.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A transmission-ratio-varying steering apparatus comprising:
   an input shaft connected to a steering wheel;
   an output shaft connected to steered wheels;
   an electric motor for varying a rotation angle of the output shaft with respect to a rotation angle of the input shaft;
   a relative-angle detection means for detecting a relative angle between the input and output shafts;
   a rotation-angle computation means for computing an absolute angle based on a relative angle detected by the relative-angle detection means;
   a non-volatile storage means for holding an absolute angle computed by the rotation-angle computation means;
   a control unit having a storage supplementary means for an absolute angle into the non-volatile storage means, wherein the control unit controls an operation to drive the electric motor in order to change the rotation angle of the output shaft; and
   a power-providing means, which is used for adjusting a voltage generated by a power supply and a generator for supplementing power supplied by the power supply to a voltage not exceeding a first predetermined voltage and supplying the adjusted voltage to the control unit when the voltage generated by the power supply and the generator is normal, and is used for discontinuing an operation to supply power to the control unit when the voltage generated by the power supply and the generator is at least equal to a second predetermined voltage wherein voltages not exceeding the first predetermined voltage are voltages in an operating range of the control unit and the second predetermined voltage is an abnormal voltage, wherein:

the transmission-ratio-varying steering apparatus further comprises adjusting means, which is electrically connected to the power supply, the generator and the power-providing means, and used for adjusting the voltage generated by the power supply and the generator to a third predetermined voltage higher than the first predetermined voltage but lower than the second predetermined voltage and supplying the adjusted voltage to the power-providing means when the voltage generated by the power supply and the generator is at least equal to the second predetermined voltage;

the adjusting means comprises a switching device having an input terminal electrically connected to to power supply and the generator, and an output terminal electrically connected to the power-providing means, wherein the voltage generated by the power supply and the generator is adjusted to the third predetermined voltage in accordance with a switching operation of the switching device;

the adjusting means comprises a switching device having an input terminal electrically connected to the power supply and the generator, and an output terminal electrically connected to the power-providing means, wherein the voltage generated by the power supply and and the generator is clamped to the predetermined voltage in accordance with a switching operation of the switching device; and adjusting means further comprises:

a power accumulation means having one end electrically connected to the output terminal of the switching device and the power-providing means, and an other end electrically connected to ground; and a switching-device drive means for driving the switching device to carry out a switching operation based on a voltage accumulated in the power accumulation means.

2. A transmission-ratio-varying steering apparatus according to claim 1, characterized in that the control unit is electrically connected to the switching device and used for generating a control signal for controlling switching operations by the switching device.

3. A transmission-ratio-varying steering apparatus according to claim 1, further comprising;

a linking means for linking the input shaft to the output shaft;

an excitement coil for operating the linking means to cut the linking between the input and output shafts; and a voltage detection means for detecting the voltage supplied by the power supply and the generator, wherein the control unit controls a current flowing through the excitement coil in order to operate the linking means, and immediately halts an operation to drive the electric motor as well as the current flawing through the excitement coil and drives the storage supplementary means to store an absolute angle in the non-volatile storage means when the voltage detected by the voltage detection means becomes at least equal to the second predetermined voltage.

4. A transmission-ratio-varying steering apparatus according to claim 1, further comprising:

a linking means for linking the input shaft to the output shaft;

an excitement coil for operating the linking means to cut linking between the input and output shafts; and a voltage detection means for detecting the voltage supplied by the power supply and the generator, wherein the control unit controls a current flowing through the excitement coil in order to operate the linking means, and when a state in which the voltage detected by the voltage detection means has been becoming at least equal to the second predetermined voltage has lapsed for a predetermined period of time, immediately halts an operation to drive the electric motor as well as the current flowing through the excitement coil and drives the storage supplementary means to store an absolute angle in the non-volatile storage means.

5. A transmission-ratio-varying steering apparatus comprising an adjusting device, wherein the adjusting device is disposed between a generator and a power supply circuit, wherein the adjusting device is for adjusting a surge voltage generated by the generator to an adjusted voltage that is within an operating range of the power-supply circuit and for outputting the adjusted voltage to the power-supply circuit, wherein the surge voltage is higher than a second predetermined voltage, wherein the adjusted voltage is set to be a third predetermined voltage that is higher than a first predetermined voltage and lower than the second predetermined voltage, wherein the adjusting device comprises; a switching device for switching to a first state when an output voltage at an output terminal of the switching device exceeds the second predetermined voltage and switching to a second state when the output voltage is less than or equal to the second predetermined voltage, wherein the adjusting device further comprises an output capacitor for accumulating the output voltage at the output terminal of the switching device, wherein the switching device switches to to second state when the output voltage accumulated in the capacitor has dissipated.

6. A transmission-ratio-varying steering apparatus comprising a adjusting device, wherein the adjusting device is disposed between a generator and a power supply circuit, wherein the adjusting device is for adjusting a surge voltage generated by the generator to a adjusted voltage that is within an operating range of the power-supply circuit and for outputting the adjusted voltage to the power-supply circuit, wherein the surge voltage is higher tan a second predetermined voltage, wherein the adjusted voltage is set to be a third predetermined voltage that is higher than a first predetermined voltage and lower than the second predetermined voltage, wherein the adjusting device comprises: a switching device for switching to a first state when an output voltage at an output terminal of the switching device exceeds the second predetermined voltage and switching to a second state when the output voltage is less than or equal to the second predetermined voltage, wherein the switching device switches between the first state and the second state based upon a control signal received from a microcomputer, wherein the microcomputer determined if the output voltage at the output terminal of the switching device exceeds the second predetermined voltage.

* * * * *